United States Patent
Fujishiro

(10) Patent No.: US 11,382,166 B2
(45) Date of Patent: Jul. 5, 2022

(54) COMMUNICATION METHOD

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 58 days.

(21) Appl. No.: 16/991,966

(22) Filed: Aug. 12, 2020

(65) Prior Publication Data

US 2020/0374969 A1 Nov. 26, 2020

Related U.S. Application Data

(63) Continuation of application No. PCT/JP2019/005092, filed on Feb. 13, 2019.

(30) Foreign Application Priority Data

Feb. 15, 2018 (JP) .............................. JP2018-025037

(51) Int. Cl.
*H04W 76/27* (2018.01)
*H04W 36/04* (2009.01)
(Continued)

(52) U.S. Cl.
CPC ........... *H04W 76/27* (2018.02); *H04W 36/04* (2013.01); *H04W 36/34* (2013.01); *H04W 72/1247* (2013.01)

(58) Field of Classification Search
CPC ..... H04W 36/04; H04W 36/34; H04W 48/20; H04W 72/1247; H04W 76/27
See application file for complete search history.

(56) References Cited

U.S. PATENT DOCUMENTS

2010/0118752 A1* 5/2010 Suzuki .............. H04W 52/0258
370/311
2013/0194991 A1* 8/2013 Vannithamby ........ H04L 5/0035
370/311
(Continued)

FOREIGN PATENT DOCUMENTS

EP          3 435 732 A1     1/2019
WO       2017/026188 A1     2/2017
(Continued)

OTHER PUBLICATIONS

3rd Generation Partnership Project; Technical Specification Group Radio Access Network; NR; NR and NG-RAN Overall Description; Stage 2; 3GPP TS 38.300 V15.0.0; Dec. 2017; pp. 1-68; Release 15; 3GPP Organizational Partners.
(Continued)

*Primary Examiner* — Kashif Siddiqui
(74) *Attorney, Agent, or Firm* — Studebaker & Brackett PC

(57) ABSTRACT

A communication method according to one embodiment comprises the steps of transmitting, by a base station, a message for transitioning a radio terminal from a Radio Resource Control (RRC) connected state to a specific state different from an RRC idle state; and receiving, by the radio terminal, the message from the base station. The specific state is a state in which a context of the radio terminal is stored in the radio terminal and the base station, and, the radio terminal performs a cell reselection mobility. The message includes an idle parameter set applied in the RRC idle state, in addition to a specific parameter set applied in the specific state.

2 Claims, 11 Drawing Sheets

(51) Int. Cl.
*H04W 36/34* (2009.01)
*H04W 72/12* (2009.01)

(56) References Cited

U.S. PATENT DOCUMENTS

| | | | |
|---|---|---|---|
| 2013/0329637 A1* | 12/2013 | Kodali | H04W 76/27 |
| | | | 370/328 |
| 2018/0176883 A1 | 6/2018 | Fujishiro et al. | |
| 2018/0213452 A1* | 7/2018 | Kim | H04L 5/0091 |
| 2019/0037420 A1 | 1/2019 | Fujishiro et al. | |
| 2019/0306739 A1* | 10/2019 | Kim | H04W 24/10 |
| 2020/0100312 A1* | 3/2020 | Hapsari | H04W 76/27 |
| 2020/0214077 A1* | 7/2020 | Da Silva | H04W 36/30 |
| 2020/0314667 A1* | 10/2020 | Fujishiro | H04W 52/0254 |

FOREIGN PATENT DOCUMENTS

| | | |
|---|---|---|
| WO | 2017/163784 A1 | 9/2017 |
| WO | 2017/170163 A1 | 10/2017 |

OTHER PUBLICATIONS

Ericsson; "NR RRC States Overview and Remaining Open Issues"; 3GPP TSG-RAN WG2 #100; R2-1713301; Nov. 27-Dec. 1, 2017; pp. 1-16; Reno, Nevada, USA.

Huawei et al.; "Remaining Issues on State Transition Between RRC Connected and Inactive"; 3GPP TSG-RAN WG2 Meeting AH 1801 (adhec_2018_01_NR); R2-1800493; Jan. 22-26, 2018; pp. 1-6; Vancouver, Canada.

LG Electronics Inc.; "Offloading UEs in RRC_Inactive"; 3GPP TSG-RAN WG2 NR AH (adhec_2018_01_NR); R2-1801360; Jan. 22-26, 2018; pp. 1-4; Vancouver, Canada.

Huawei; "RAN Paging Enhancement"; 3GPP TSG-RAN WG3 Meeting #97bis; R3-173704; Oct. 9-13, 2017; pp. 1-8; Prague, Czech Republic.

LG Electronics Inc.,"Cell reselection parameters for Inactive mode", 3GPP TSG-RAN WG2 NR Ad hoc 0118, R2-1801429, Jan. 22-26, 2018, pp. 1-2, Vancouver, Canada.

Huawei, Hisilicon, "RRC state transition from Inactive to Idle", 3GPP TSG-RAN WG2 Meeting #100, R2-1712574, Nov. 27-Dec. 1, 2017, 5 pages, Reno, Nevada, USA.

* cited by examiner

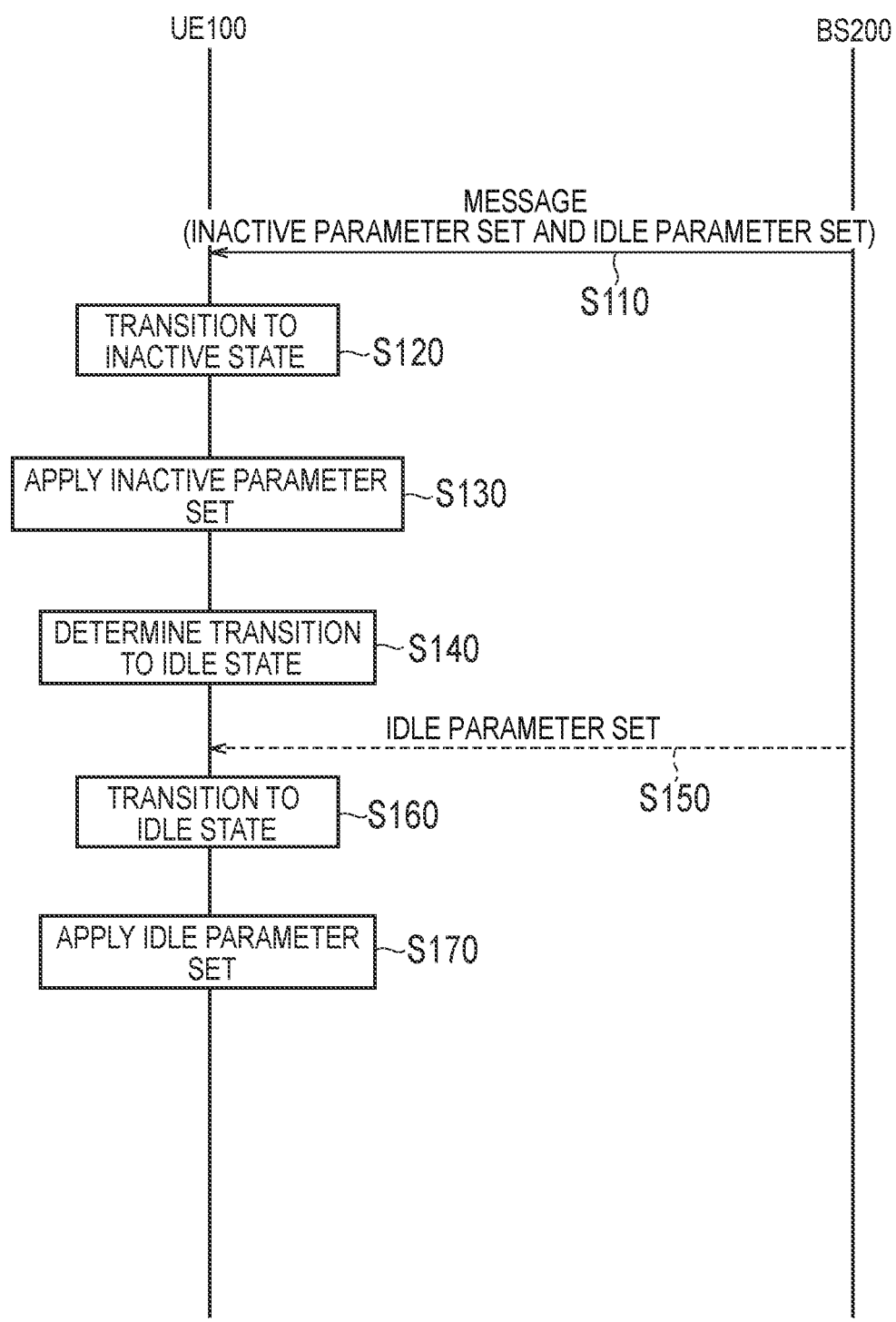

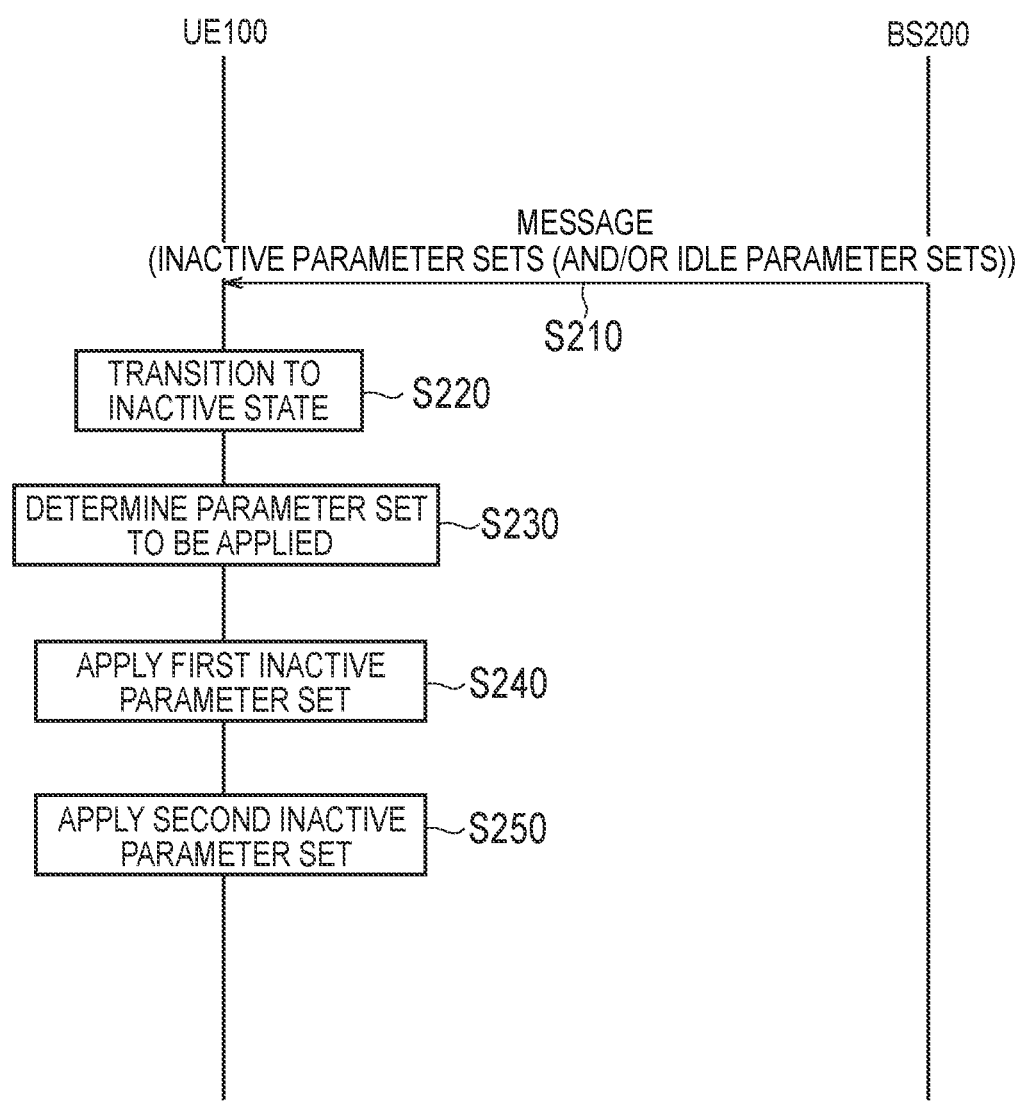

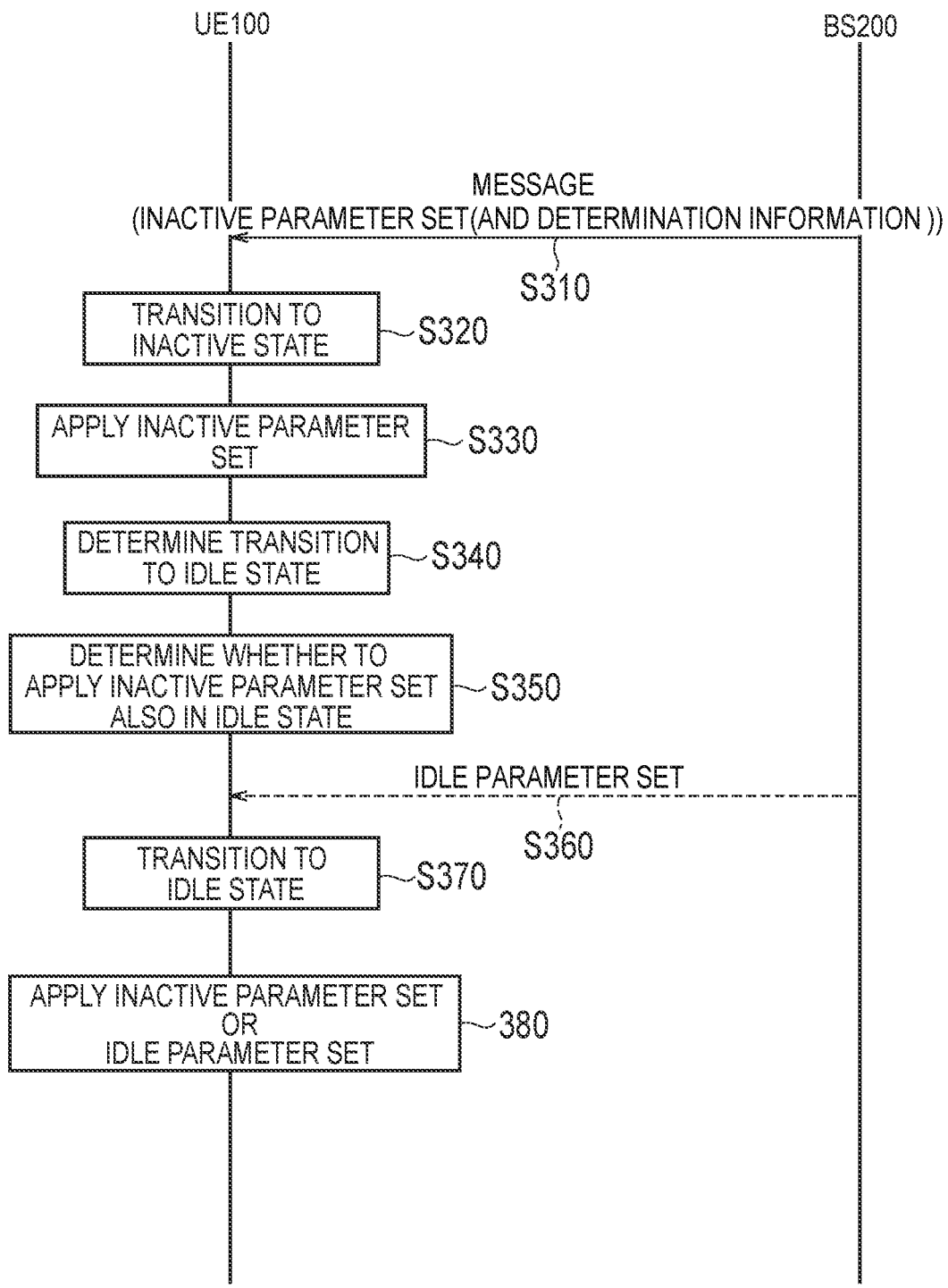

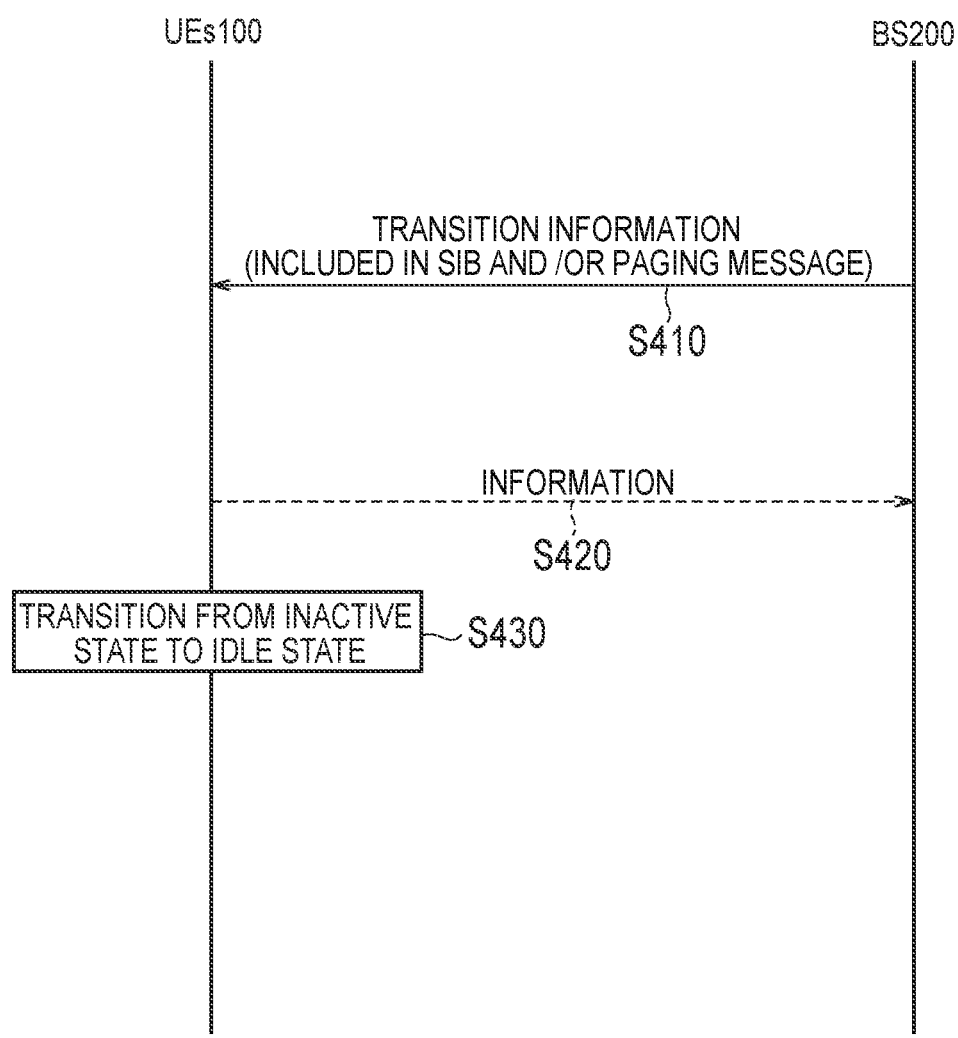

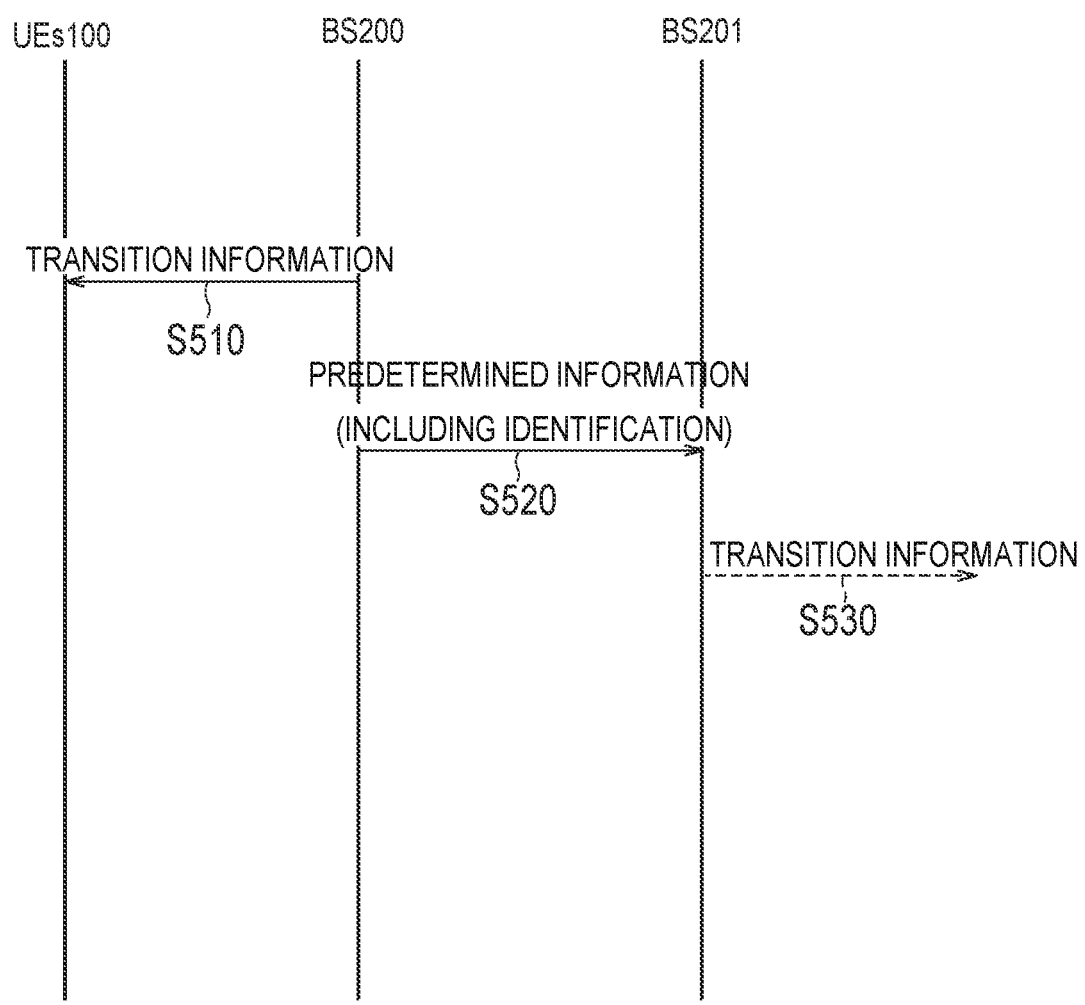

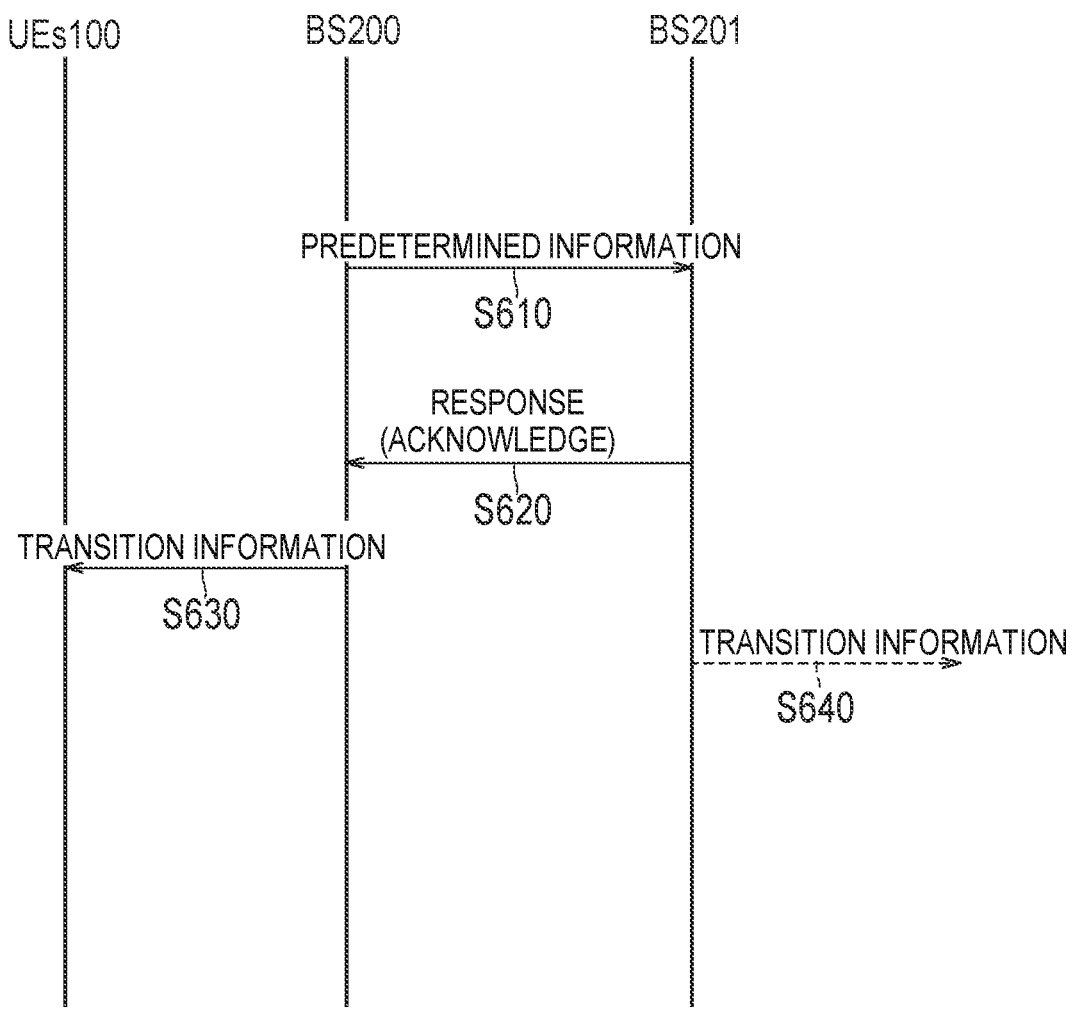

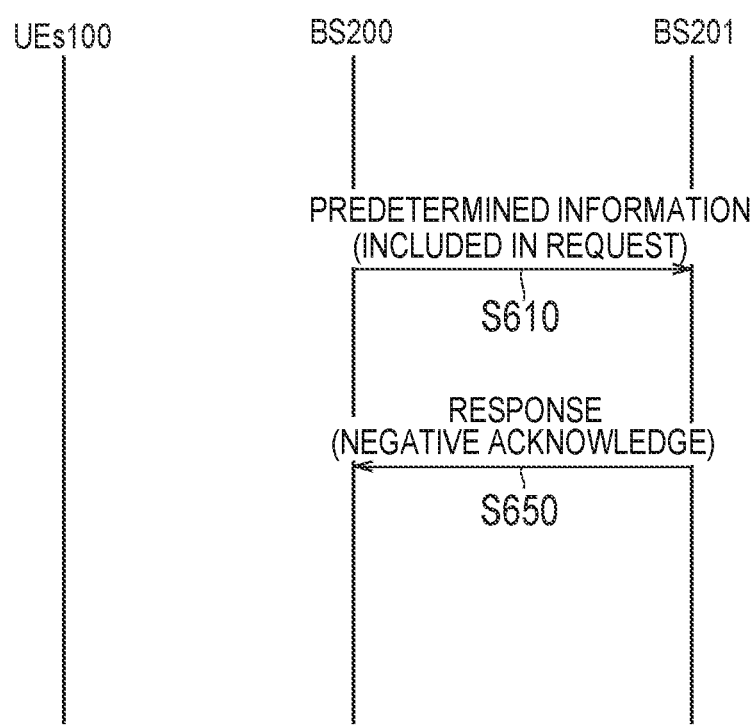

COMMUNICATION METHOD

RELATED APPLICATIONS

The present application is a continuation based on PCT Application No. PCT/JP2019/005092, filed on Feb. 13, 2019, which claims the benefit of Japanese Patent Application No. 2018-025037 (filed on Feb. 15, 2018). The content of which is incorporated by reference herein in their entirety.

TECHNICAL FIELD

The present disclosure relates to a communication method.

BACKGROUND ART

An RRC inactive state is defined in the specifications established by the 3rd Generation Partnership Project (3GPP), which is a standardization project for mobile communication systems (see Non patent Literature 1).

The RRC inactive state is a state in which a context is stored in a radio terminal and a base station as in an RRC connected state, and the radio terminal executes a cell reselection mobility as in the RRC idle state.

CITATION LIST

Non Patent Literature

Non patent Literature 1: 3GPP technical specification "TS38.300 V15.0.0" Jan. 4, 2018

SUMMARY

A communication method according to one embodiment comprises transmitting, by a base station, a message for transitioning a user equipment from a Radio Resource Control (RRC) connected state to a RRC inactive state, receiving, by the user equipment, the message from the base station, starting, by the user equipment, a timer included in the message, transitioning, by the user equipment in the RRC inactive state, to the RRC idle state from the RRC inactive state after the timer being expired, discarding, by the user equipment, a cell reselection priority included in the message in response to transitioning to the RRC idle state, and applying, by the user equipment, another cell reselection priority acquired from the base station. The RRC inactive state is a state in which a context of the user equipment is stored in the user equipment and the base station, and, the user equipment performs a cell reselection mobility.

A communication method according to one embodiment comprises transmitting, by a base station, a message for transitioning a user equipment from a Radio Resource Control (RRC) connected state to a RRC inactive state, receiving, by the user equipment, the message from the base station. The RRC inactive state is a state in which a context of the user equipment is stored in the user equipment and the base station, and, the user equipment performs a cell reselection mobility. The message includes a plurality of specific parameter sets applied in the RRC inactive state. The plurality of specific parameter sets have different application conditions from each other. The method comprises applying, by the user equipment, a specific parameter set satisfying the application condition out of the plurality of specific parameter sets.

BRIEF DESCRIPTION OF DRAWINGS

FIG. 7 is a sequence diagram for explaining a first operation example.

FIG. 8 is a sequence diagram for explaining a second operation example.

FIG. 9 is a sequence diagram for explaining a third operation example.

FIG. 10 is a sequence diagram for explaining a fourth operation example.

FIG. 11 is a sequence diagram for explaining a fifth operation example.

FIG. 12 is a sequence diagram for explaining a sixth operation example.

FIG. 13 is a sequence diagram for explaining the sixth operation example.

DESCRIPTION OF EMBODIMENTS

Overview of Embodiments

Figure 1:
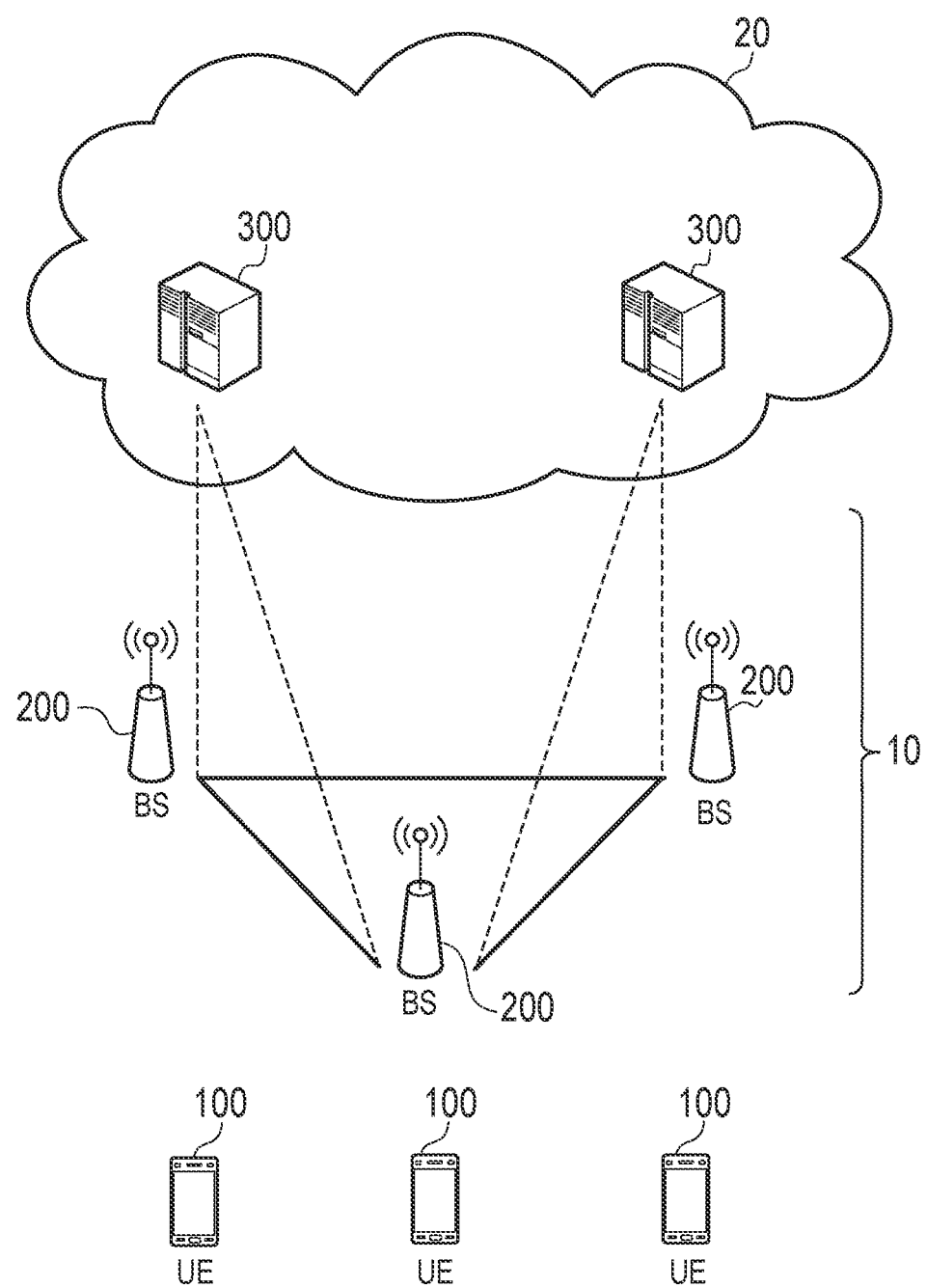
FIG. 1 is a diagram illustrating a configuration of a communication system.

A communication method according to one embodiment includes the steps of transmitting, by a base station, a message for transitioning a radio terminal from a Radio Resource Control (RRC) connected state to a specific state different from an RRC idle state, and receiving, by the radio terminal, the message from the base station. The specific state is a state in which the context of the radio terminals are stored in the radio terminals and the base station, and the radio terminals execute cell reselection mobility. The message includes an idle parameter set applied in the RRC idle state in addition to a specific parameter set applied in the specific state.

The communication method may include the steps of starting, by the radio terminal, a timer for determining an application of the idle parameter set, and applying, by the radio terminal, the idle parameter set when transitioning to the RRC idle state before the timer is expired from the specific state to the RRC idle state.

The communication method may include the steps of starting, by the radio terminal, a timer for determining an application of the idle parameter set, and applying, by the radio terminal, another idle parameter set acquired from the base station instead of the idle parameter set included in the message when transitioning to the RRC idle state after the timer is expired.

The message may include a plurality of specific parameter sets applied in the specific state. The plurality of specific parameter sets may have different application conditions. The communication method may include the step of applying, by the radio terminal, the specific parameter set satisfying the application condition among the plurality of specific parameter sets.

The plurality of specific parameter sets may be applied at different timings as the application conditions.

A communication method according to one embodiment includes the steps of transmitting, by a base station, a message for transitioning a radio terminal from a Radio Resource Control (RRC) connected state to a specific state different from an RRC idle state, and receiving, by the radio terminal, the message from the base station. The specific state is a state in which the context of the radio terminal is stored in the radio terminal and the base station, and the radio terminal executes a cell reselection mobility. The message includes a specific parameter set applied in the specific state. The communication method further includes the step of determining, by the radio terminal, whether to apply the specific parameter set included in the message also in the RRC idle state.

The message may include determination information for the radio terminal to determine whether to apply the specific parameter set also in the RRC idle state.

The communication method may include the steps of starting, by the radio terminal, a timer for measuring an expiration date of the determination information, and determining, by the radio terminal, whether to apply the specific parameter set in the RRC idle state according to the determination information when the timer is running.

The communication method may include the steps of starting, by the radio terminal, a timer for measuring an expiration date of the determination information, and determining, by the radio terminal, whether to apply the specific parameter set also in the RRC idle state without complying with the determination information when the timer is expired.

A communication method according to one embodiment includes the steps of transmitting, by a base station, transition information to a plurality of radio terminals in a Radio Resource Control (RRC) connected state and a specific state different from an RRC idle state to transition from the specific state to the RRC idle state, and receiving, by the radio terminal, the transition information from the base station. The specific state is a state in which the context of the radio terminals is stored in the radio terminals and the base station constituting the plurality of radio terminals, and the radio terminal executes a cell reselection mobility.

In the step of transmitting the transition information, the base station may transmit the transition information at a timing at which some of all the radio terminals in the specific state can receive the transition information.

In the step of transmitting the transition information, the base station may transmit the transition information together with identification information of some of the radio terminals which transition to the RRC idle state among all the radio terminals in the specific state.

The transition information may include information used as a condition for identifying some of the radio terminals to be transitioned to the RRC idle state.

The communication method may include the step of notifying, by the radio terminal, the base station of information indicating a transition to the RRC idle state when transitioning to the RRC idle state according to the transition information.

The communication method may include the step of sending, by the base station, predetermined information indicating transmission of the transition information in the base station to an adjacent base station.

In the step of sending the predetermined information, the base station may send the predetermined information to the adjacent base station after transmitting the transition information.

In the step of sending the predetermined information, the base station may send the predetermined information to the adjacent base station before transmitting the transition information. The communication method may further include the step of stopping the base station from transmitting the transition information when receiving a rejection response from the adjacent base station.

The predetermined information may include identification information for identifying the plurality of radio terminals transitioning to the RRC idle state.

The communication method may include the steps of receiving, by the adjacent base station, the predetermined information from the base station, and transmitting, by the adjacent base station, the transition information in a cell managed by the adjacent base station.

Embodiments

Communications System

The communication system will be described below. FIG. 1 is a diagram illustrating a configuration of a mobile communication system. An LTE system will be described as an example of the mobile communication system.

As illustrated in FIG. 1, the LTE system includes a UE (User Equipment) 100, a RAN (Radio Access Network) 10, and a core network 20.

The UE 100 corresponds to a radio terminal. The UE 100 performs radio communication with a cell (BS 200 described later). The configuration of the UE 100 will be described later.

The UE 100 may be a radio terminal that can be carried by a user, such as a mobile phone (for example, a smartphone), a tablet, or a mobile personal computer. The UE 100 may be, for example, a communication apparatus (wearable terminal) that can be worn by a user, such as a watch, glasses, a wristband, or an accessory. The UE 100 may be a communication apparatus provided in a ridable machine (for example, a vehicle, a motorcycle, a bicycle, a ship, an airplane, etc.) or an air vehicle (for example, a drone). The UE 100 may be a ridable machine or an air vehicle itself equipped with a communication apparatus. The UE 100 may be a communication module that is detachable from the ridable machine. The UE 100 may be a fixed radio terminal.

The RAN 10 corresponds to a radio access network. The RAN 10 is, for example, an E-UTRAN (Evolved Universal Terrestrial Radio Access Network). The RAN 10 may be an NG-RAN (Next Generation Radio Access Network).

The RAN 10 includes a BS (Base Station) 200. The BS 200 is a node constituting the RAN 10. The BS 200 corresponds to a (radio) base station. The BS 200 is, for example, an eNB 200 (evolved Node-B). The BS 200 may be an ng-eNB (next Generation evolved Node-B). The BS 200 may be a gNB (next Generation Node-B).

The BS 200 may be a node capable of performing radio communication with the UE 100. The BSs 200 may be connected to each other via a predetermined interface. The configuration of the BS 200 will be described later.

The BS 200 manages one or more cells. The BS 200 performs radio communication with the UE 100 that has established a connection with the cell managed by the BS 200. The BS 200 has a radio resource management (RRM) function, a routing function for user data (hereinafter, sometimes referred to as "data"), a measurement control function for mobility control and scheduling, and the like.

"Cell" is used as a terminology indicating a minimum unit of a radio communication area. The "cell" may also be used as a terminology indicating a function of performing radio communication with the UE 100. A "cell" may be a downlink resource. A "cell" may be a combination of a downlink resource and an uplink resource. A link between the carrier frequency of the downlink resource and the carrier frequency of the up resource may be included in system information transmitted on the downlink resource. "Cell" may be used as a terminology indicating carrier and/or frequency.

The core network 20 is, for example, an EPC (Evolved Packet Core). The core network 20 includes a network apparatus 300. The network apparatus 300 is, for example, an MME (Mobility Management Entity). The MME performs, for example, various mobility controls on the UE 100. The network apparatus 300 may be an SGW (Serving Gateway). The SGW performs, for example, data transfer control. The network apparatus (MME and/or SGW) 300 is connected to the BS 200 via a predetermined interface.

The core network 20 may be a 5GC (5G Core Network). The network apparatus 300 is, for example, an AMF (Access and Mobility Management Function). The AMF performs mobility management control for example. The network apparatus 300 may be a UPF (User Plane Function). The UPF has, for example, an anchor point function for intra and/or inter RAT mobility. The network apparatus (AMF and/or UPF) 300 is connected to the BS 200 via a predetermined interface.

Figure 2:
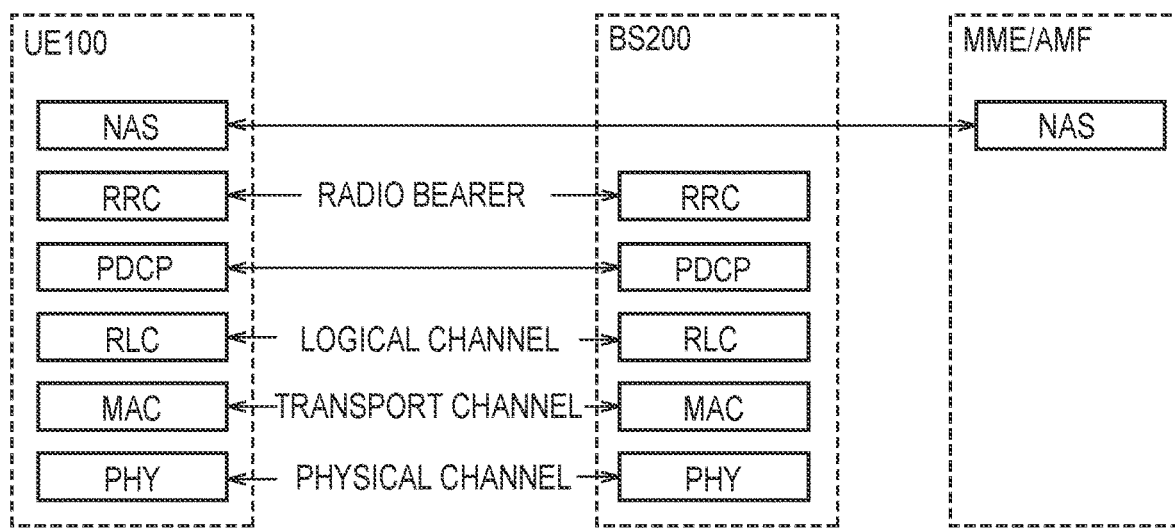
FIG. 2 is a protocol stack diagram of a radio interface (control plane).
Figure 3:
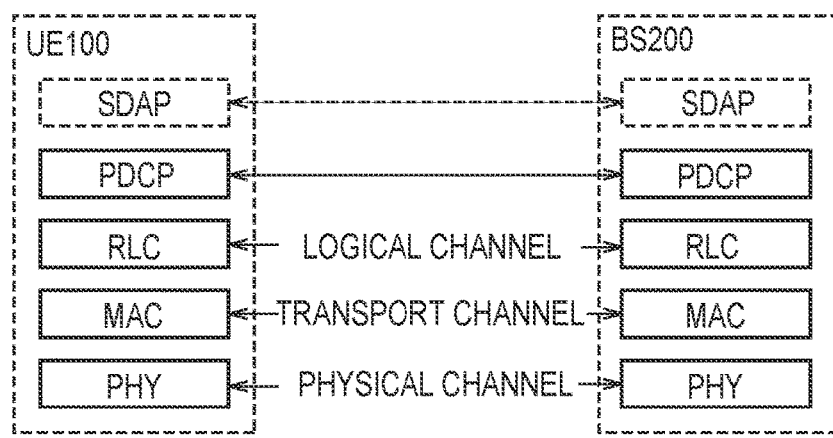
FIG. 3 is a protocol stack diagram of a radio interface (user plane).

FIG. 2 is a protocol stack diagram of a radio interface (control plane). FIG. 3 is a protocol stack diagram of a radio interface (user plane).

As illustrated in FIG. 2, the radio interface protocol is divided into the first to third layers of the OSI reference model. The first layer is a physical (PHY) layer (physical entity). The second layer includes a MAC (Medium Access Control) layer (MAC entity), an RLC (Radio Link Control) layer (RLC entity), and a PDCP (Packet Data Convergence Protocol) layer (PRCP entity). The third layer includes an RRC (Radio Resource Control) layer (RRC entity).

The physical layer performs encoding/decoding, modulation/demodulation, antenna mapping/demapping, and resource mapping/demapping. Data and control signals are transmitted between the physical layer of the UE 100 and the physical layer of the BS 200 via a physical channel.

The MAC layer performs a data priority control, a retransmission process using a hybrid ARQ (HARQ), a random access procedure, and the like. Data and control signals are transmitted via a transport channel between the MAC layer of the UE 100 and the MAC layer of the BS 200. The MAC layer of the BS 200 includes a scheduler (MAC scheduler). The scheduler determines uplink and downlink transport formats (transport block size, modulation and coding scheme (MCS)) and resource blocks allocated to the UE 100.

The RLC layer uses the functions of the MAC layer and the physical layer to transmit data to the RLC layer on the receiving side. Data and control signals are transmitted between the RLC layer of the UE 100 and the RLC layer of the BS 200 via a logical channel.

The PDCP layer performs header compression/decompression, and encryption (ciphering)/decryption (deciphering).

The RRC layer is defined only in the control plane that handles the control signal. Messages (RRC messages) for various settings are transmitted between the RRC layer of the UE 100 and the RRC layer of the BS 200. The RRC layer controls logical channels, transport channels, and physical channels according to establishment, re-establishment, and release of radio bearers. When there is an RRC connection between the RRC of the UE 100 and the RRC of the BS 200, the UE 100 is in the RRC connected state. When there is no RRC connection between the RRC of the UE 100 and the RRC of the BS 200, the UE 100 is in the RRC idle state.

A NAS (Non-Access Stratum) layer located above the RRC layer performs, for example, session management and mobility management.

An SDAP (Service Data Adaptation Protocol) in FIG. 3 provides a 5GC QoS flow. For example, the SDAP performs mapping between QoS flows and data radio bearers.

Radio Terminal

Figure 4:
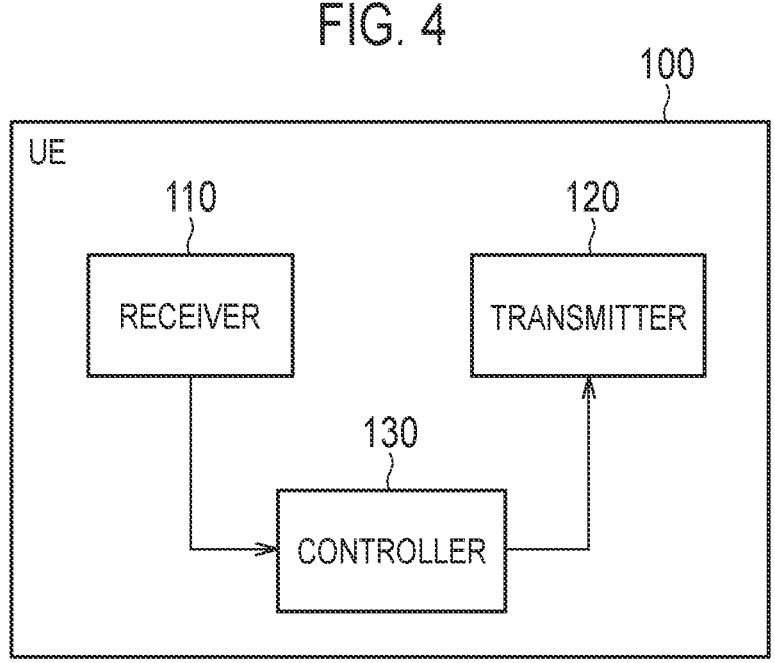
FIG. 4 is a block diagram of a UE 100.

The UE 100 (radio terminal) according to the embodiment will be described. FIG. 4 is a block diagram of the UE 100. As illustrated in FIG. 4, the UE 100 includes a receiver 110, a transmitter 120, and a controller 130. The receiver 110 and the transmitter 120 may be an integrated transceiver (transceiver).

The receiver 110 performs various types of reception under the control of the controller 130. The receiver 110 includes an antenna. The receiver 110 converts a radio signal received by the antenna into a baseband signal (received signal). The receiver 110 outputs the baseband signal to the controller 130.

The transmitter 120 performs various types of transmission under the control of the controller 130. The transmitter 120 includes an antenna. The transmitter 120 converts the baseband signal (transmission signal) output by the controller 130 into a radio signal. The transmitter 130 transmits the radio signal from the antenna.

The controller 130 performs various controls in the UE 100. The controller 130 includes a processor and a memory. The memory stores a program executed by the processor and information used for processing by the processor. The processor includes a baseband processor and a CPU (Central Processing Unit). The baseband processor performs, for example, modulation/demodulation and encoding/decoding of a baseband signal. The CPU executes various programs by executing the programs stored in the memory. The processor may include a codec for encoding/decoding audio/video signals. The processor executes various processes described below and various communication protocols described above.

The UE 100 may include a GNSS (Global Navigation Satellite System) receiver. The GNSS receiver can receive a GNSS signal in order to obtain position information indicating the geographical position of the UE 100. The GNSS receiver outputs the GNSS signal to the controller 130. The GNSS receiver may include a GPS (Global Positioning System) receiver for acquiring the position information of the UE 100.

In this specification, the process executed by at least one of the receiver 110, the transmitter 120, and the controller 130 included in the UE 100 will be described as a process (operation) executed by the UE 100 for convenience.

Base Station

Figure 5:
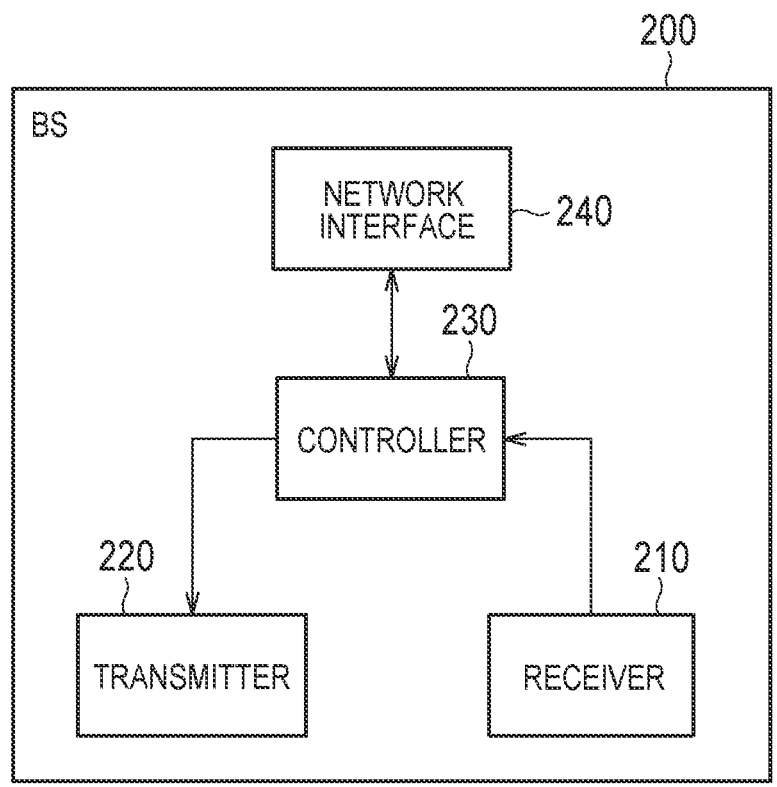
FIG. 5 is a block diagram of a BS 200.

The BS 200 (base station) according to the embodiment will be described. FIG. 5 is a block diagram of the BS 200. As illustrated in FIG. 5, the BS 200 includes a receiver 210, a transmitter 220, a controller 230, and a network interface 240. The transmitter 220 and the receiver 210 may be an integrated transceiver (transceiver).

The receiver 210 performs various types of reception under the control of the controller 230. The receiver 210 includes an antenna. The receiver 210 converts a radio signal received by the antenna into a baseband signal (received signal). The receiver 210 outputs the baseband signal to the controller 230.

The transmitter 220 performs various types of transmission under the control of the controller 230. The transmitter 220 includes an antenna. The transmitter 220 converts the baseband signal (transmission signal) output by the controller 230 into a radio signal. The transmitter 220 transmits the radio signal from the antenna.

The controller 230 performs various controls in the BS 200. The controller 230 includes a processor and a memory. The memory stores a program executed by the processor and information used for processing by the processor. The processor includes a baseband processor and a CPU. The baseband processor performs, for example, modulation/demodulation, encoding/decoding, and the like of a baseband signal. The CPU performs various processes by executing a program stored in the memory. The processor executes various processes described below and various communication protocols described above.

The network interface 240 may be connected to an adjacent BS 200 via a predetermined interface (for example, X2 interface, Xn interface). The network interface 240 may be connected to the network apparatus 300 via a predetermined interface (for example, S1 interface, NG interface, etc.). The network interface 240 may be used for communication with the BS 200 and/or the network apparatus 300 via a predetermined interface, for example.

In this specification, the process executed by at least one of the receiver 210, the transmitter 220, the controller 230, and the network interface 240 included in the BS 200 will be described as a process (operation) executed by the BS 200 for convenience.

RRC Inactive State

Figure 6:
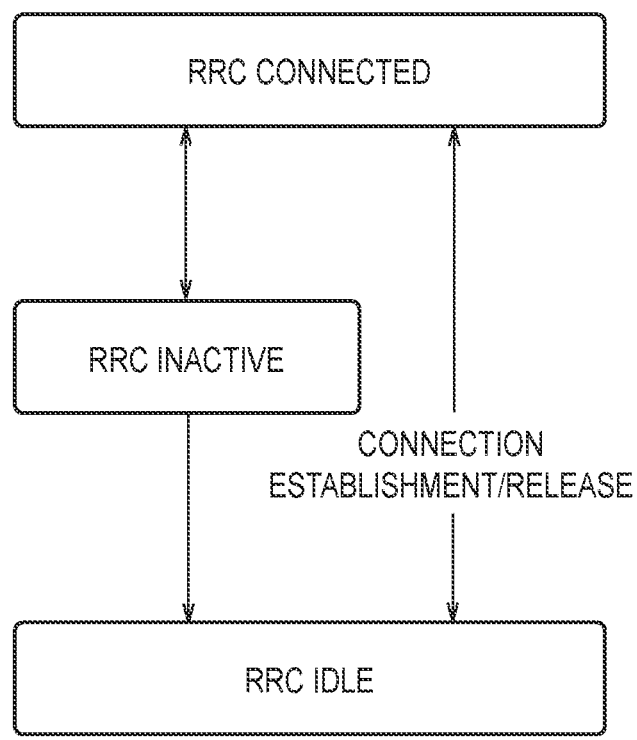
FIG. 6 is a diagram for explaining an RRC inactive state.

The RRC inactive state will be described with reference to FIG. 6. FIG. 6 is a diagram for explaining the RRC inactive state.

The RRC inactive state is a state different from the RRC idle state and the RRC connected state. The RRC inactive state is a state in which the context of the UE 100 is stored in the UE 100 and the BS 100 (the RAN 10) as in the RRC connected state.

The context may be a UE AS context. The UE AS context may include information for reestablishment. The UE AS context may include a UE radio access capability. The context may include a security context. The security context may include KeNB*, tokens, NCC, UE EPS security capabilities, and security algorithms.

The RRC inactive state is a state in which the UE 100 executes cell reselection mobility, like the RFC idle state. In cell reselection mobility, the UE 100 can autonomously reselect a cell.

When the UE 100 is in the RRC inactive state, the UE 100 is in a CM connected state (CM-CONNECTED). In the CM connected state, the connection (for example, S1 connection) between the BS 200 and the network apparatus 300 is established. The UE 100 can move within the area configured by the NG-RAN without notifying the NG-RAN. In the RRC inactive state, the last BS 200 (serving gNB node) can hold the context and the connection with the network apparatus (AMF and UPF) 300 (for example, UE-associated NG connection). Therefore, in the RRC inactive state, the connection between the BS 200 and the network apparatus 300 may be maintained.

As illustrated in FIG. 6, the UE 100 transitions from the RRC idle state (RRC IDLE) to the RRC connected state (RRC CONNECTED) by establishing a connection with the BS 200 (network). The UE 100 transitions from the RRC connected state to the RRC idle state by releasing the connection.

The UE 100 is in the RRC inactive state when the connection is inactive. The UE 100 can transition from the RRC connected state to the RRC inactive state. The UE 100 may be able to transition from the RRC inactive state to the RRC connected state. The UE 100 can transition from the RRC inactive state to the RRC idle state. The RRC idle state may be an NR RRC idle state under the control of the NG-RAN. The RRC idle state may be an E-UTRAN RRC idle state under the control of the E-UTRAN. The UE 100 may transition from the RRC inactive state to the RRC idle state by (cell) reselection, for example. The UE 100 may transition between the NR RRC idle state and the E-UTRAN RRC idle state by (cell) reselection, for example.

The RRC inactive state may be referred to as the NR RRC inactive state. The RRC connected state may be referred to as an NR RRC connected state (NR RRC CONNECTED state).

Operation According to Embodiment

The operation according to the embodiment will be described by taking first to third operation examples. It should be noted that the description of the overlapping contents in each operation example may be omitted.

First Operation Example

The first operation example will be described with reference to FIG. 7. FIG. 7 is a sequence diagram for explaining the first operation example.

In Step S110 of FIG. 7, the BS 200 transmits a message for transitioning the UE 100 from the RRC connected state to the RRC inactive state. The UE 100 receives the message from the BS 200.

The message contains an inactive parameter set applied in the RRC inactive state. The message contains an idle parameter set applied in the RRC idle state in addition to the inactive parameter set.

The inactive parameter set includes one or more inactive parameters applied in the RRC inactive state. The parameter may be, for example, a parameter applied when the UE 100 performs (cell) reselection. For example, the parameter may be an absolute priority for reselection. The parameter may be a redistribution priority for reselection. The parameter may be an offset value for Reference Signal Received Power (RSRP). The parameter may be an offset value for Reference Signal Received Quality (RSRQ).

The idle parameter set includes one or more idle parameters applied in the RRC inactive state. The parameter may be a parameter applied to each UE, not a common parameter. The idle parameter may be the same parameter as the inactive parameter.

The idle parameter set may have an expiration date. The UE 100 may apply the idle parameter set when the idle parameter set has not expired. The UE 100 may not apply the idle parameter set when the idle parameter set has expired.

The message may include information (for example, time) indicating the expiration date of the idle parameter set. The message may include a timer value for measuring the expiration date of the idle parameter set. The message may include a timer value for determining the application of the idle parameter set.

In Step S120, the UE 100 transitions to the inactive state.

The UE 100 may start a timer for determining the application of the idle parameter set when transitioning to the inactive state. The UE 100 may use the timer value included in the message in Step S110. The UE 100 may use the timer value transmitted by the BS 200 in a message different from the message in Step S110. The timer value may be included in the system information block (SIB), for example. The UE 100 may send a request for (missing) system information to the BS 200 to obtain the timer value. The UE 100 can start the timer to which the timer value from the BS 200 is applied.

In Step S130, the UE 100 applies the inactive parameter set. The UE 100 may perform the reselection using the applied parameter, for example.

In Step S140, the UE 100 can determine to transition to the RRC idle state in the RRC inactive state.

The UE 100 may decide to transition to the RRC idle state, for example, according to an instruction from the BS 200. The UE 100 may autonomously determine the transition to the RRC idle state. The UE 100 may autonomously determine the transition to the RRC idle state by executing reselection, for example.

The UE 100 may determine to transition from the RRC inactive state to the RRC idle state when a predetermined period has elapsed from the transition to the RRC inactive state. The UE 100 may start a timer for determining (measuring) a predetermined period (that is, a period in which the RRC inactive state is held). The UE 100 may start the timer when transitioning to the RRC inactive state. The UE 100 may determine to transition from the RRC inactive state to the RRC idle state when the timer is expired. The timer value corresponding to the timer may be included in the message in Step S110.

The UE 100 may determine to acquire the idle parameter set when the idle parameter set has expired. The UE 100 may determine to acquire the idle parameter set, for example, when the timer for determining the application of the idle parameter set has expired. The UE 100 may perform the process of Step S150 when it is determined that the idle parameter set is acquired. The UE 100 may omit the process of Step S150 when the idle parameter set has not expired (the idle parameter set is valid).

In Step S150, the BS 200 transmits the idle parameter set. The BS 200 may broadcast (transmit) the SIB including the idle parameter set. The UE 100 may send a request for (missing) system information to the BS 200 to obtain the idle parameter set. The UE 100 may receive the idle parameter set. This allows the UE 100 to acquire the idle parameter set.

In Step S160, the UE 100 transitions to the RRC idle state.

In Step S170, the UE 100 applies the idle parameter set.

The UE 100 may apply the idle parameter set included in the message in Step S110 when the idle parameter set has not expired (the idle parameter set is valid). The UE 100 may apply the idle parameter set included in the message of Step S110 when transitioning to the RRC idle state before the timer is expired.

The UE 100 may not apply the idle parameter set included in the message in Step S110 when the idle parameter set has expired (the idle parameter set is invalid). The UE 100 may not apply the idle parameter set included in the message of Step S110 when transitioning to the RRC idle state after the expiration of the timer. In this case, the UE 100 may apply another idle parameter set acquired from the BS 200 instead of the idle parameter set included in the message in Step S110.

The UE 100 may discard (release) the idle parameter set when the idle parameter set included in the message in Step S110 is not applied.

The UE 100 may apply the idle parameter set acquired from the BS 200 when the timer expires (the expiration date has elapsed) after applying the idle parameter set included in the message of Step S110. Alternatively, the UE 100 may stop the timer for measuring the expiration date when the idle parameter set included in the message in Step S110 is applied. When applying the idle parameter set once, the UE 100 may continue to apply the idle parameter set until another idle parameter set is applied, even if the expiration date has elapsed thereafter.

As described above, the message from the BS 200 includes the idle parameter set applied in the RRC idle state in addition to the inactive parameter set. With this configuration, when the UE 100 transitions from the RRC inactive state to the RRC idle state, it is possible to notify the UE 100 of the applicable idle parameter set (individually) without signaling from the BS 200 to the UE 100. Therefore, the BS 200 can appropriately control the UE 100 even if the UE 100 in the RRC inactive state cannot be flexibly controlled.

When the idle parameter set has the expiration date, the BS 200 can suppress the UE 100 from applying the individually notified idle parameter set at an unexpected timing.

Second Operation Example

The second operation example will be described with reference to FIG. 8. FIG. 8 is a sequence diagram for explaining the second operation example.

In the second operation example, the BS 200 may transmit a plurality of inactive parameter sets. The BS 200 may transmit a plurality of idle parameter sets.

In Step S210 of FIG. 8, the BS 200 transmits a message for transitioning the UE 100 from the RRC connected state to the RRC inactive state. The UE 100 receives the message from the BS 200.

The message of Step S210 may include a plurality of inactive parameter sets. The message of Step S210 may include a plurality of idle parameter sets. Therefore, the message of Step S210 may include a plurality of parameter sets of at least one of the plurality of inactive parameter sets and the plurality of idle parameter sets.

Hereinafter, an example in which the message of Step S210 includes the plurality of inactive parameter sets will be described, but the same may be applied to the plurality of idle parameter sets.

The plurality of inactive parameter sets have different application conditions. For example, the plurality of inactive parameter sets may have different application timings as application conditions. The plurality of inactive parameter sets may be applied at different places as application conditions. The place may be defined by, for example, at least one of each RAN notification area (that is, an area configured by NG-RAN), each cell, and each beam (area formed by the beam). The place may be defined by longitude and/or latitude (for example, geographical zone). The RAN notification area (that is, the area configured by the NG-RAN) may be an area associated with paging by the RAN 10 (RAN paging), or may be an area capable of providing RAN paging.

The message of Step S210 may include a plurality of timer values for determining the application timing (time and/or period) of each inactive parameter set. The plurality of timer values may be associated with each inactive parameter set. Each inactive parameter set may include a timer value. There may be an inactive parameter set that does not include a timer value.

A plurality of inactive parameter sets may be associated with information indicating the priority of application. Each inactive parameter set may include information indicating the priority of application.

A case in which a plurality of inactive parameter sets include a first parameter set and a second parameter set will be described as an example.

Step S220 corresponds to Step S120.

In Step S230, the UE 100 determines the parameter set to apply. The UE 100 may determine the parameter set to apply before Step S220.

The UE 100 determines a parameter set that satisfies the application condition. The UE 100 may determine the parameter set to apply based on the information included in each parameter set.

The UE 100 may determine to apply the parameter set including the redistribution priority first, for example. The UE 100 may decide to apply the parameter set including the absolute priority for reselection later.

The UE 100 may determine the parameter set to apply based on the information indicating the priority of application.

The description will proceed assuming that the UE 100 has decided to apply the first parameter set.

In Step S240, the UE 100 applies the first parameter set (First Inactive parameter set) among the plurality of inactive parameter sets.

In Step S240, the UE 100 applies the first parameter set. The UE 100 may start a timer associated with the first parameter set (a timer with a corresponding timer value set) when the first parameter set is applied.

The UE 100 determines to apply the second parameter set when the first parameter set no longer satisfies the application condition.

The UE 100 may determine that the first parameter set no longer satisfies the application condition when the timer associated with the first parameter set is expired. The UE 100 may determine that the first parameter set no longer satisfies the application condition when moving from the place associated with the first parameter set.

The UE 100 may determine to apply the second parameter set when it is determined that the first parameter set no longer satisfies the application condition. In this case, the UE 100 may execute the process of Step S250.

In Step S250, the UE 100 applies the second parameter set (Second Inactive parameter set).

The UE 100 may start a timer associated with the second parameter set. The UE 100 may determine that the second parameter set no longer satisfies the application condition when the timer associated with the second parameter set is expired. The UE 100 may acquire the inactive parameter set from the BS 200 when a parameter set that satisfies the application condition does not exist among the plurality of inactive parameter sets. The BS 200 may broadcast (transmit) the SIB including the inactive parameter set, for example. The UE 100 may send a request for (missing) system information to the BS 200 to acquire the inactive parameter set. The UE 100 may apply the acquired inactive parameter.

As described above, the BS 200 can transmit a message including the plurality of inactive parameter sets. With this configuration, the BS 200 can execute flexible control without transitioning the UE 100 in the RRC inactive state to the RRC idle state.

Third Operation Example

The third operation example will be described with reference to FIG. 9. FIG. 9 is a sequence diagram for explaining the third operation example.

In the third operation example, the UE 100 determines whether to apply the inactive parameter set also in the RRC idle state.

In Step S310, the BS 200 transmits a message for transitioning the UE 100 from the RRC connected state to the RRC inactive state. The UE 100 receives the message from the BS 200.

The message contains the inactive parameter set. The message may include determination information for the UE 100 to determine whether to apply the inactive parameter set included in the message also in the RRC idle state. The message may not include the determination information.

The determination information may indicate to apply the inactive parameter set in the RRC idle state. The determination information may indicate that the inactive parameter set is not applied in the RRC idle state.

The determination information may be an identifier. The UE 100 may indicate to apply the inactive parameter set in the RRC idle state when the identifier indicates a first value (for example, "1"). The UE 100 may indicate that the inactive parameter set is not applied in the RRC idle state when the identifier indicates a second value (for example, "0"). The first value and the second value may be opposite (the first value is "0" and the second value is "1"). The UE 100 may implicitly determine that "0" is set when the message does not include the identifier.

The message may include a timer value for measuring the expiration date of the determination information. The determination information may be implicitly notified by the timer value. That is, the determination information may be the timer value. For example, the UE 100 may determine to apply the inactive parameter set in the RRC idle state when the determination information is the timer value.

Steps S320 to S340 correspond to Steps S120 to S140.

The UE 100 may start a timer for measuring the expiration date of the determination information. The UE 100 may apply the timer value included in Step S310 to the timer. The UE 100 may apply the timer value included in the SIB acquired from the BS 200 to the timer.

In Step S350, the UE 100 determines whether to apply the inactive parameter set also in the RRC idle state.

The UE 100 may determine whether to apply the inactive parameter set also in the RRC idle state according to the determination information.

The UE 100 may determine to apply the inactive parameter set in the RRC idle state when the determination information indicates that the inactive parameter set is applied in the RRC idle state. The UE 100 may determine not to apply the inactive parameter set in the RRC idle state when the determination information indicates that the inactive parameter set is not applied in the RRC idle state.

The UE 100 may make a determination according to the determination information when the timer for measuring the expiration date of the determination information is running. The UE 100 may make a determination when the timer is expired without depending on the determination information.

The BS 100 may include in the message only the determination information indicating that the inactive parameter set is applied in the RRC idle state. In this case, the UE 100 may determine not to apply the inactive parameter set when the message does not include the determination information. The BS 100 may include in the message only the determination information indicating that the inactive parameter set is not applied in the RRC idle state. In this case, the UE 100 may determine to apply the inactive parameter set when the message does not include the determination information.

Step S360 corresponds to Step S150. The UE 100 may execute the process of Step S360 when it is determined that the inactive parameter set is not applied in the RRC idle state. For example, when the message of Step S310 includes an idle parameter set as in the first operation example, the UE 100 may omit the process of Step S360 even if it determines that the inactive parameter set is not applied.

Step S370 corresponds to Step S160.

In Step S380, the UE 100 can apply the inactive parameter set or the idle parameter set according to the determination result in Step S350. When applying the inactive parameter set, the UE 100 may continue the application. The UE 100 can apply the idle parameter set when not applying an inactive parameter set.

As described above, the UE 100 can determine whether to apply the inactive parameter set also in the idle state. This allows the BS 200 to notify the UE 100 (individually) of an applicable idle parameter set without including the idle parameter set in the message.

Fourth Operation Example

The fourth operation example will be described with reference to FIG. 10. FIG. 10 is a sequence diagram for explaining the fourth operation example.

In the fourth operation example, the BS 200 transmits transition information for transitioning from the RRC inactive state to the RRC idle state to the plurality of UEs 100 in the RRC inactive state.

In an initial state of the operation of FIG. 10, the plurality of UEs 100 are in the RRC inactive state. In the following, since the respective operations of the plurality of UEs 100 are similar, one UE 100 will be described as an example.

In Step S410, the BS 200 transmits the transition information. The UE 100 receives the transition information from the BS 200.

The BS 200 may broadcast the transition information to the plurality of UEs 100 that are in the RRC inactive state. The BS 200 may transmit the transition information by at least one of the SIB and the paging message.

The BS 200 may transmit the transition information in order to transition all UEs 100 in the RRC inactive state among the plurality of UEs 100 managed by the BS 200 to the RRC idle state (simultaneously).

The BS 200 may use at least one of the following methods in order to transition some UE 100 of all UEs 100 in the RRC inactive state to the RRC idle state.

First, the BS 200 can transmit the transition information at a timing when the UE 100 of all the UEs 100 in the RRC inactive state can receive the transition information.

For example, the BS 200 knows a period during which the UE 100 performing discontinuous reception (DRX) or eDRX (extended DRX)) monitors the paging message. Therefore, the BS 200 may transmit the paging message including the transition information during a period in which some UEs 100 monitor the paging message. As a result, among the UEs 100 in the RRC inactive state, the UE 100 that does not monitor the paging message during the period does not receive the transition information. Therefore, the BS 200 can transition only some UEs 100 from the RRC inactive state to the RRC idle state.

Since the BS 200 can specify the UE 100 that monitors the paging message during the period when the paging message including the transition information is transmitted, the BS 200 can also grasp the UE 100 that has transitioned to the RRC idle state.

The transition information may be an identifier on the RRC message (for example, "true"). The transition information may be a bit (Direct Indication) in DCI (Downlink Control Information) transmitted using PDCCH (Physical Downlink Control Channel). The PDCCH may be at least one of EPDCCH (Enhanced Physical Downlink Control Channel), MPDCCH (MTC Physical Downlink Control Channel), and NPDCCH (Narrowband Physical Downlink Control Channel).

Secondly, the BS 200 can transmit the transition information together with the identification information for identifying some of the radio terminals that transition to the RRC idle state. The BS 200 may transmit a list of identifiers of some radio terminals together with the transition information. The BS 200 may include the transition information in the paging record in the paging message. Since the UE identifier (Paging UE-Identity) is included in the paging record, the UE 100 that has received the paging message can determine whether to transition to the RRC idle state.

Thirdly, the BS 200 may transmit the transition information including information used as a condition for specifying some of the radio terminals to transition to the RRC idle state. The BS 200 may include, for example, "X" (and "Y") substituted in the conditions below as the information in the transition information. The BS 200 may include the following predetermined value in the transition information as the information. The predetermined value may be defined in advance. The predetermined value may be configured in advance in the UE 100 (Pre-configuration).

The UE 100 can determine whether the condition is met using the information. For example, the UE 100 determines whether a condition (for example, "(UE identification information mod Predetermined value (for example, 100))≤X" or "Y≤(UE identification information mod Predetermined value)≤X") is satisfied. The UE 100 may determine to transition to the RRC idle state when the condition is satisfied. For example, the UE 100 may determine to transition to the RRC idle state when the UE identification information mod the predetermined value is X or less. The UE 100 may determine to transition to the RRC idle state when the UE identification information mod the predetermined value is Y or more and X or less.

The UE identification information may be identification information for the BS 200 to identify the UE 100. The identification information may be a unique identifier (I-RNTI (Radio Network Temporary Identifier)) used to identify a context (UE context) for the RRC inactive state. The identification information may be a unique identifier (Resume ID) used for an RRC connection restart procedure. The UE identification information may be IMSI (International Mobile Subscriber Identity).

In Step S420, the UE 100 may notify the BS 200 of information indicating the transition to the RRC idle state when transitioning to the RRC idle state according to the transition information. The UE 100 may transmit the information before transitioning to the RRC idle state.

The UE 100 may transmit the information after transitioning to the RRC idle state. The UE 100 may transmit the information in a random access procedure. For example, the UE 100 may include the information in Message 3 (Schedule Transmission), which is the transmission scheduled by the BS 200. The UE 100 may transmit Message 1 using a unique random access preamble. The BS 200 may include information for setting a unique random access preamble in the transition information. This allows the BS 200 to grasp the UE that is the sender of Message 1.

The information may be identification information for the BS 200 to identify the UE 100, or may include the identification information.

Step S430 corresponds to Step S160.

As described above, the BS 200 can transmit the transition information for transitioning from the RRC inactive state to the RRC idle state.

In the case of the RRC inactive state, the network holds the context (UE context) and the connection. It is assumed that the UE 100 in the RRC inactive state transitions to the RRC idle state by the load on the network (the BS 200, AMF, UPF, etc.) side or a reset operation on the network side. In this case, when the UE 100 in the RRC inactive state is transited to the RRC connection and then transitions to the RRC idle state, the network load may be heavy. In addition, it may take time for the UE 100 to transition to the RRC idle state.

In the fourth operation example, since the BS 200 can transmit the transition information for transitioning from the RRC inactive state to the RRC idle state, the UE 100 in the RRC inactive state can transition to the RRC idle state without transitioning to the RRC connection. Therefore, signaling between the UE 100 and the BS 200 can be reduced. In particular, when transitioning a plurality of UEs 100 (all UEs 100) in the RRC inactive state to the RRC idle state, the load on the BS 200 can be reduced.

Fifth Operation Example

The fifth operation example will be described with reference to FIG. 11. FIG. 11 is a sequence diagram for explaining the fifth operation example.

In the fifth operation example, the BS 200 sends predetermined information indicating the transmission of the transition information in the BS 200 to the BS 201 which is the base station adjacent to the BS 200. The BS 200 sends the predetermined information to the BS 201 after sending the transition information.

The adjacent base station may be, for example, a base station included in an area configured by NG-RAN. The adjacent base station may be a base station connected to the BS 200 via a predetermined interface (for example, X2 interface).

Step S510 corresponds to Step S410. The operation of the UE 100 is the same as that of the fourth operation example, and therefore will be omitted.

In Step S520, the BS 200 sends predetermined information to the BS 201. The BS 201 receives the predetermined information from the BS 201.

The predetermined information indicates the transmission of transition information in the BS 200. It may indicate that the BS 200 has transmitted the transition information (already). The predetermined information may be information indicating the release of the UE 100 in the RRC inactive state in the BS 200. The predetermined information may be information indicating that the UE 100 in the RRC inactive state has been released (already) in the BS 200. The predetermined information may be information for stopping the transmission (Context Fetch) of a message requesting the context of the UE 100 to the BS 200.

The predetermined information may include identification information for identifying the UE 100 that transitions to the RRC idle state. The identification information may be an identifier (I-RNTI, Resume ID, etc.) assigned by the network (for example, the BS 200). The identification information may be information indicating a paging occasion where the transition information is transmitted.

The BS 201 can grasp that the transition information is transmitted in the BS 200 when receiving the transition information. Therefore, the BS 201 can grasp that the BS 200 does not hold (store) the context of the UE 100 in the RRC inactive state. Therefore, the BS 201 does not have to request the context of the UE 100 to the BS 200 even if the BS 201 receives the request for establishing the RRC connection from the UE 100 from the RRC inactive state. As a result, signaling between BSs can be reduced.

In Step S530, the BS 201 may transmit the transition information in the cell managed by the BS 201. The BS 201 may transmit transition information with respect to the plurality of UEs 100 identified by identification information. This allows the UE 100 to grasp that the context and the connection are released in the BS 201, even if the UE 100 moves to the cell managed by the BS 201 before receiving the transition information from the BS 200.

As a result, the UE 100 does not have to send a request for transitioning from the RRC inactive state to the RRC connected state, so unnecessary signaling can be reduced.

Also, in the case where the BS 200 has assigned other UEs with the same identification information as the identification information assigned to the UE 100 (for example, I-RNTI), the UE 100 can send the identification information to the BS 200 assigned to the UE 100 when returning to the cell managed by the BS 200. In this case, the BS 200 recognizes the UE 100 as another UE. As a result, the BS 200 may mistakenly send information for another UE to the UE 100, or may handle information from the UE 100 as information for another UE (mistake of information). On the other hand, in the fifth operation example, the UE 100 transitions from the RRC inactive state to the RRC idle state by receiving the transition information from the BS 201, so that information to be retained (stored) in the RRC inactive state (for example, the identification information assigned by the BS 200) is not used. As a result, it is possible to prevent the information from being mixed up.

Sixth Operation Example

The sixth operation example will be described with reference to FIGS. 12 and 13. FIGS. 12 and 13 are sequence diagrams for explaining the sixth operation example.

In the sixth operation example, the BS 200 sends predetermined information to the BS 201 before sending the transition information.

Step S610 corresponds to Step S520. The predetermined information may be the same information as the fifth operation example. The predetermined information may be information for requesting approval of transmission of the transition information in the BS 200. The predetermined information may be information for requesting release of the RRC inactive state in the BS 201.

The BS 201 may execute the process of Step S620 when approving the request from the BS 200. The BS 201 may execute the process of Step S650 of FIG. 13 when disapproving of the request from the BS 200 (rejecting). The BS 200 may reject the request, for example, when it does not support the transmission of the transition information.

In Step S620, the BS 201 sends a response to the predetermined information to the BS 200. The response is an approval response (ACKNOWLEDGE) for approving the request from the BS 200. The approval response may be a message that approves the request from the BS 200. The response may include information indicating that the request from the BS 200 is approved.

Step S630 corresponds to Step S510. The BS 200 may transmit the transition information when receiving the response transmitted by the BS 201 for approving the request from the BS 200.

Step S640 corresponds to Step S530.

In Step S650, the BS 200 sends a response to the predetermined information to the BS 200. The response is a rejection response (NEGATIVE ACKNOWLEDGE) transmitted by the BS 201 for rejecting the request from the BS 200. The rejection response may be a message that rejects the request from the BS 200. The response may include information indicating that the request from the BS 200 is rejected. The response may include information indicating the reason for refusing.

The BS 200 stops transmitting the transition information when receiving the rejection response. That is, the BS 200 does not transmit the transition information. The BS 201 does not send the transition information when sending the rejection response.

As described above, the BS 200 transmits the transition information only when the request is approved by the adjacent BS 210. As a result, since harmony can be achieved in the entire network, it is possible to suppress the problem described in the fifth operation example (for example, misunderstanding of information).

Other Embodiments

Although the contents of the present application have been described with the above-described embodiments, it should not be understood that the description and drawings forming a part of the present disclosure limit the contents of the present application. From this disclosure, various alternative embodiments, examples, and operation techniques will be apparent to those skilled in the art.

In the above-described second operation example, the plurality of inactive parameter sets have been described as an example, but as described above, the BS 200 may transmit a plurality of idle parameter sets. Therefore, the "inactive parameter set" may be replaced with the "idle parameter set". In addition, the BS 200 may transmit a message that includes both the plurality of inactive parameter sets and the plurality of idle parameter sets.

In the case where the BS 200 transmits a message containing the plurality of idle parameter sets, the UE 100 may start a timer associated with the idle parameter set to be applied first, when transitioning to the RRC inactive state. When the UE 100 transitions from the RRC inactive state to the RRC idle state, the UE 100 may apply the idle parameter set associated with the timer when the timer is running. The UE 100 may not apply the idle parameter set associated with the timer when the timer is expired.

In a case where the UE 100 is in the RRC inactive state, the UE 100 may discard (release) the idle parameter set associated with the timer when the timer is expired. In the RRC inactive state, the UE 100 may start the timer associated with the idle parameter set to be applied next, when the timer is expired. In this case, the UE 100 may take the same actions as the idle parameter set to be applied first.

In the above fourth operation example, the UE 100 notifies the BS 200 of the information indicating the transition to the RRC idle state when transitioning to the RRC idle state according to the transition information. The UE 100 may notify (transmit) the BS 200 of the information using a common resource with other UEs. The UE 100 may transmit Message 1 using the common resource, for example. The BS 200 can grasp the approximate number of UEs 100 that have transitioned from the RRC inactive state to the RRC idle state by the received power in the common resource without setting a unique random access preamble for each UE.

In the above fourth operation example, the BS 200 has transmitted the transition information to the plurality of UEs 100 that are in the RRC inactive state. The BS 200 may transmit the transition information with respect to a single UE 100. The BS 200 may transmit the transition information to one UE 100 using a separate message.

In the fifth and sixth operation examples described above, the BS 200 may send predetermined information to a plurality of BSs as adjacent base stations.

In the above description, the case where the UE 100 is in the RRC inactive state has been described as an example, but the invention is not limited to this. The above operation may be similarly performed when the UE 100 is in a write connection state. The write connection state is a substrate of the RRC connected state. In the present specification, "RRC inactive" may be replaced with "write connection". For example, in the LTE system, "write connection" may be used. In 5G systems, "RRC inactive" may be used.

In the embodiment described above, the UE 100 may be a sensor module (M2M device). The UE 100 may be a radio communication apparatus (for example, IoT GW (Internet of Things Gate Way)) that manages (a plurality of) sensor modules. The IoT GW may perform communication with the network on behalf of the (plurality of) sensor module(s) managed by the IoT GW. The sensor module may not have the function of performing communication with the network. The sensor module managed by the IoT GW may have a function of executing communication with the IoT GW.

The contents according to the above-described embodiments (respective operation examples) may be appropriately combined and executed. In addition, in each of the sequences described above, not all operations are necessarily required. For example, only some operations may be performed in each sequence.

Although not particularly mentioned in the above-described embodiments, a program may be provided that causes a computer to execute each process performed by any of the above-described nodes (the UE 100, the BS 200, the network apparatus 300, etc.). The program may be recorded in a computer-readable medium. The computer-readable medium can be used to install the program on a computer. Here, the computer-readable medium in which the program is recorded may be a non-transitory recording medium. The non-transitory recording medium is not particularly limited, but may be a recording medium such as a CD-ROM or a DVD-ROM.

A chip configured by a memory that stores a program for executing each process performed by one of the UE 100 and the BS 200 and a processor that executes the program stored in the memory may be provided.

In the above-described embodiment, a system defined by 3GPP has been described as an example of a mobile communication system, but the present invention is not limited to this system, and the contents of the present application may be applied to other systems.

The invention claimed is:

1. A communication method, comprising:
transmitting, by a base station, a message for transitioning a user equipment from a Radio Resource Control (RRC) connected state to a RRC inactive state;
receiving, by the user equipment, the message from the base station;
starting, by the user equipment, a timer included in the message;
transitioning, by the user equipment in the RRC inactive state, to the RRC idle state from the RRC inactive state after the timer being expired;
discarding, by the user equipment, a cell reselection priority included in the message in response to transitioning to the RRC idle state; and
applying, by the user equipment, another cell reselection priority acquired from the base station;
wherein the RRC inactive state is a state in which a context of the user equipment is stored in the user equipment and the base station, and, the user equipment performs a cell reselection mobility.

2. The communication method according to claim 1, comprising:
applying, by the user equipment, an idle parameter set included in the message in response to transitioning from the RRC inactive state to the RRC idle state before the timer is expired.

* * * * *